United States Patent [19]
Gaenzler

[11] 3,745,818
[45] July 17, 1973

[54] PORTABLE APPARATUS FOR TESTING FUEL INJECTION ENGINES

[76] Inventor: Carl W. Gaenzler, 29300 Goddard Road, Romulus, Mich. 48174

[22] Filed: July 21, 1971

[21] Appl. No.: 164,648

[52] U.S. Cl............................................. 73/119 A
[51] Int. Cl. ....................................... G01m 15/00
[58] Field of Search................. 73/119 A, 412, 168, 73/407 R

[56] References Cited
UNITED STATES PATENTS

| | | | |
|---|---|---|---|
| 2,924,971 | 2/1960 | Schroeder et al. | 73/168 |
| 2,226,545 | 12/1940 | Blasig | 73/407 R |
| 3,478,580 | 11/1969 | Siemietkowski et al. | 73/119 A |

Primary Examiner—Jerry W. Myracle
Attorney—Charles W. Chandler

[57] ABSTRACT

Portable apparatus for indicating fuel pressure and flow rate in selected locations in the fuel injection system of either a naturally aspirated or a supercharged engine while it is being operated on a parked vehicle in order to diagnose the condition of each fuel injection component.

9 Claims, 5 Drawing Figures

INVENTOR
CARL W. GAENZLER

INVENTOR
CARL W. GAENZLER

Attorney

PORTABLE APPARATUS FOR TESTING FUEL INJECTION ENGINES

BACKGROUND OF THE INVENTION

This invention relates to portable apparatus for providing information about fuel flow in a fuel injection system in order to determine the operating condition of selected components of the system.

Fuel injection internal combustion engines are used in both aircraft and automotive vehicles. The fuel delivery components of such engines are designed such that the pressure and flow rate of each component should read within certain ranges if it is operating according to manufacturers specifications.

Prior to my invention, maintenance personnel usually diagnosed the unsatisfactory performance of a fuel injection system by either removing the injection components from the engine for testing on precision test apparatus, or adjusting the system on the engine while the vehicle is in a parked position. In the latter situation, the practice of many personnel has been to diagnose and adjust the fuel injection components according to the sound of the engine at selected engine speeds.

A problem with diagnosing fuel injection performance by ear is that the engine sometimes appears to respond to the adjustment of one component whereas another component of the system may be faulty and require replacement. Although some test equipment has been available for testing individual components, such as the fuel pump, the metering unit and the nozzles, most equipment of this type has been cumbersome to use unless each component is removed from the engine before being tested.

SUMMARY OF THE INVENTION

A broad purpose of the present invention is to provide improved portable apparatus for diagnosing the operating condition of each component of a fuel injection system for an internal combustion engine without removing the system from the engine. The preferred apparatus is used to determine fuel flow and pressure at several selected locations on either a naturally aspirated or a supercharged engine that is operable to drive a vehicle, such as an aircraft. The diagnosis is performed while the vehicle is in a parked position.

To reduce the subjective element in diagnosing engine performance, the preferred apparatus permits the user to determine the operating condition of each fuel injection component by comparing operating pressures and flow rates at selected engine speeds to manufacturers' specifications at such speeds. The user can determine if adjustments to the fuel pump, the metering unit or the fuel air control valve are appropriate, or whether such components should be replaced.

Still further objects and advantages will become apparent to those skilled in the art of the invention upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
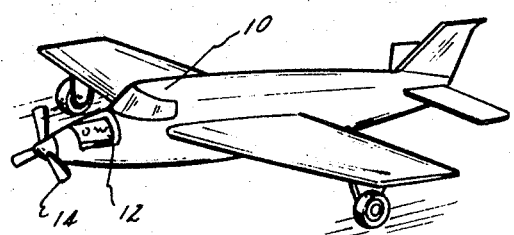
FIG. 1 is a perspective view of an aircraft having a fuel injection engine, and shown in a parked position.

Referring to the drawings, FIG. 1 illustrates an aircraft 10 having a six cylinder fuel injection internal combustion engine 12 connected to a propeller 14. It is to be understood that the preferred apparatus is described for use with an aircraft engine only for illustrative purposes. Such apparatus can be used as well as fuel injection engines mounted in other types of vehicles.

Figure 2:
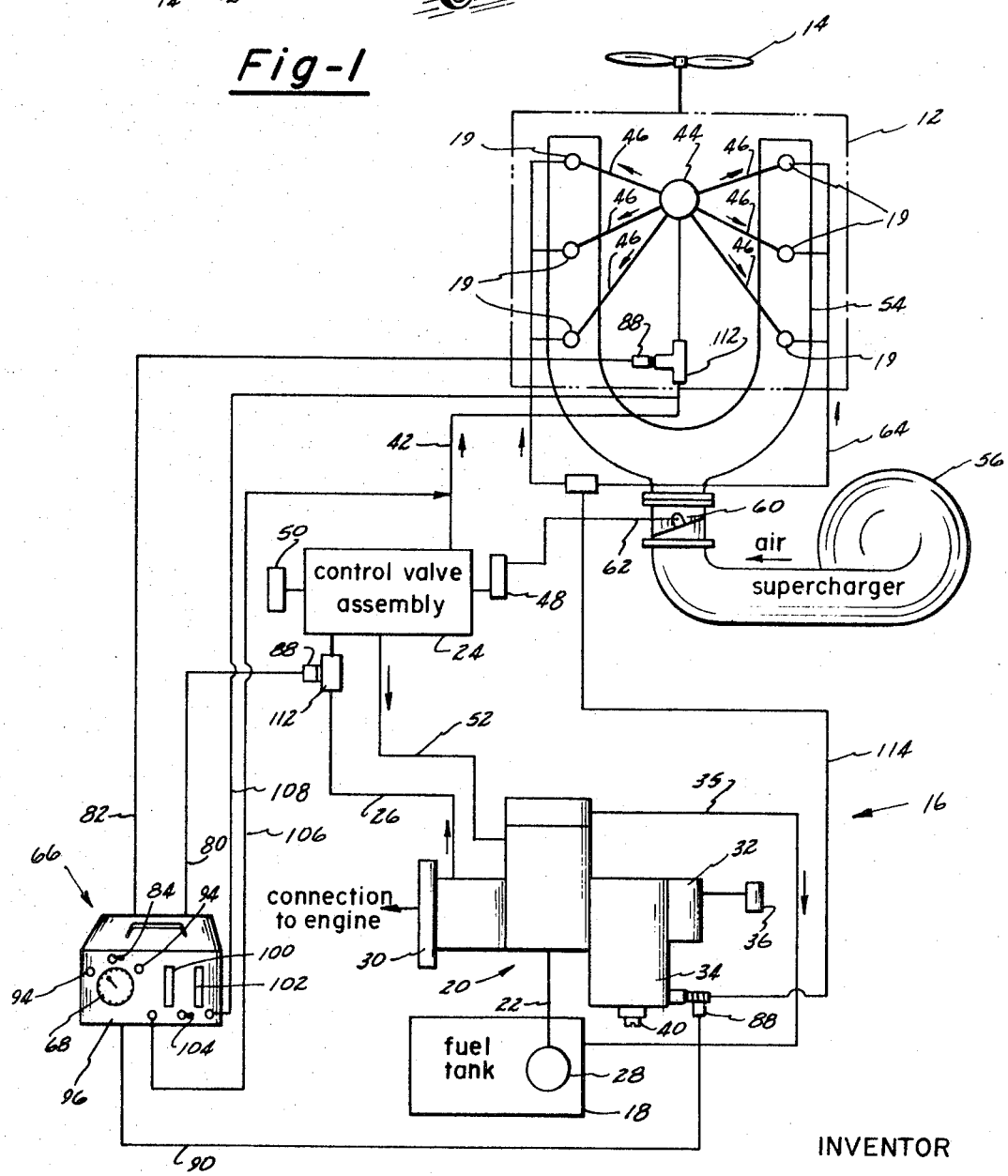
FIG. 2 is a diagrammatic illustration showing test apparatus embodying my invention connected to the fuel injection system of the engine of FIG. 1.

Referring to FIG. 2, engine 12 has a conventional commercially available fuel injection system, generally indicated at 16, for delivering fuel from a tank 18 to six injector nozzles 19, each being disposed in a corresponding cylinder of the engine. Each injection nozzle 19 is a conventional assembly for receiving both fuel and air which are injected as a mixture into an engine cylinder. Fuel injection system 16 includes an engine driven pump assembly 20 which receives fuel through an inlet 22 from tank 18 and delivers such fuel to a control valve assembly 24 through an outlet 26. The fuel being delivered through outlet 26 is referred to as unmetered fuel supply.

Pump assembly 20 has an internal bypass (not shown) for fuel being delivered from tank 18 by a boost pump 28. Boost pump 28 is employed when engine 12 is being started, or in the event of failure of pump assembly 20. Boost pump 28 is normally de-energized when engine 12 is operating from fuel delivered by pump assembly 20.

Pump assembly 20 includes a drive section 30 drivingly connected to engine 12 for delivering fuel to outlet 26 in accordance with the engine's operation. The amount of fuel delivered during each engine revolution is controlled by a relief valve 32 and aneroid means 34. As pump assembly 20 receives fuel from inlet 26, a portion of the fuel, in liquid and vapor form, is returned by a conduit 35 to tank 18. Turning a relief valve member 36 is operative to either increase or reduce the amount of fuel being delivered through outlet 26.

Aneroid means 34, a component of supercharged engines, controls the fuel output of pump assembly 20 in response to changes in atmospheric pressure at different aircraft altitudes. A member 40 is carried by aneroid means 34 for adjusting the output pressure of the fuel. Member 40 is turned counter-clockwise to increase fuel pressure and clockwise to reduce the pressure of fuel being delivered through outlet 26.

Control valve assembly 24 delivers the fuel through a conduit 42 to manifold 44 at a metered pressure. Manifold 44 is connected by a fuel conduit 46 to each injector nozzle 19. The pressure of the metered fuel is controlled by adjusting the position of a lever 48 mounted on control valve assembly 24. The air fuel ratio of the fuel mixture is controlled by adjusting the position of a mixture lever 50. In the "full rich" position of lever 50, a portion of the fuel received from outlet 26 is returned through conduit 52 to pump assembly 20.

Lever 50 is also employed to shut off fuel delivery to manifold 44 in order to terminate operation of engine 12. Manifold 44 is also useful as a means for preventing fuel leakage into the engine cylinders when the engine is shut down.

Engine 12 has an air manifold 54 for receiving air under pressure from a supercharger 56. Air manifold 54 delivers the air to the cylinders of engine 12 for mixing with fuel received from injector nozzles 19. An air throttle assembly 60 is mounted at the inlet of air manifold 54 to control the air flow rate to the engine cylinders. An adjustable link rod assembly 62 connects air throttle assembly 60 to lever 48 of the control valve assembly for controlling the ratio of fuel and air being delivered to the engine cylinders.

Another air manifold 64 delivers air from supercharger 56 to each injector nozzle 19 where the air is mixed with fuel in the intake port of each cylinder before being delivered into the cylinder.

Portable test apparatus 66 provides means for diagnosing problems in the fuel injection system as engine 12 is being operated. Apparatus 66 will be described with reference to testing and adjusting a supercharged engine, however, such apparatus can be employed to test a naturally aspirated engine.

Figure 3:
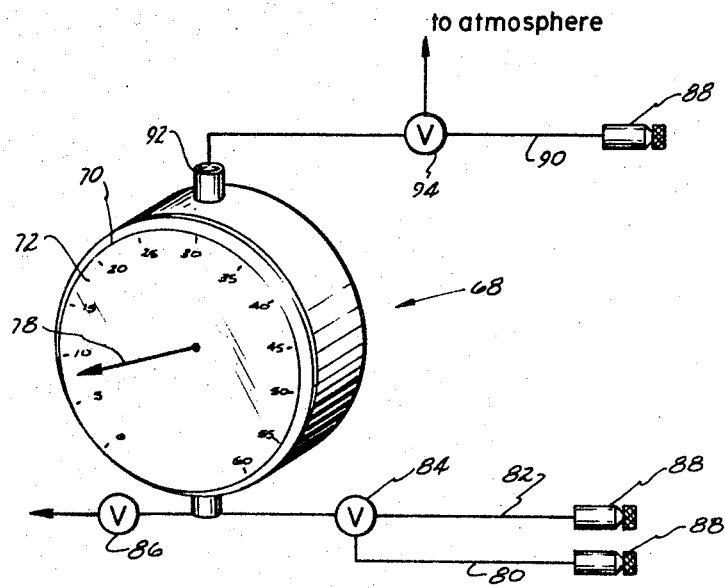
FIG. 3 is a view of a preferred pressure gage.
Figure 4:
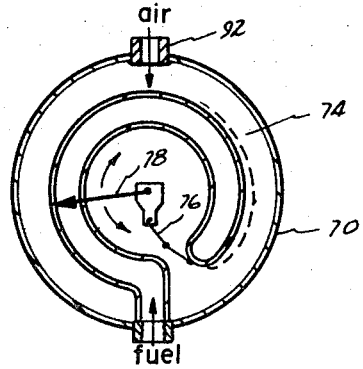
FIG. 4 is a view of the gage of FIG. 3 with the face plate removed.

Referring to FIGS. 2, 3 and 4, test apparatus 66 includes a pressure gage 68 having a sealed housing 70, including a face 72 of plastic. Face 72 is slightly flexible to accommodate changes in internal pressure in housing 70 when it is connected to supercharger 56. An elongated, resilient, pressure-responsive tube 74 is mounted in housing 70 and bent in a generally circular configuration. One end of tube 74 is fixed to housing 70 and adapted to receive fuel under pressure, and its other end is connected by linkage 76 to a rotatably mounted needle 78. Tube 74 is so formed that as fluid pressure in the tube is increased, the tube tends to straighten out. In response to such a tube motion, needle 78 traverses face plate 72 to indicate the difference between the fuel pressure in the tube and the air pressure in housing 70.

A pair of flexible conduits 80 and 82 connect the fuel inlet of tube 74 to fuel injection system 16. A selector valve 84 provides means for selectively opening communication between tube 74 and either conduit 80 or conduit 82. A fuel bleed valve 86 is connected adjacent the inlet of tube 74 to remove air from conduits 80 and 82.

Conduits 80 and 82 each have a conventional releasible coupling 88 connected to their respective free ends. Another elongated, flexible conduit 90 is connected to an air inlet 92 of housing 70. Conduit 90 also has a releasible coupling 88 carried on its outer end. A valve 94 is mounted in conduit 90 to fluidly connect the interior of housing 70 to either the atmosphere or to supercharger 56, depending upon whether a naturally aspirated or a supercharged engine is being tested. Valve 94 is closed to the atmosphere whenever a supercharged engine is being tested and opened when a naturally aspirated engine is being tested.

Test apparatus 66 includes a portable case 96 in which gage 68 and its associated valves are mounted. Flow meter means 98 are also mounted in case 96, and includes flow meters 100 and 102 for indicating fuel flow between fuel injection components. Flow meter 100 is calibrated from 0 - 52.5 pounds per hour for relatively low flow rates during idling adjustments while flow meter 102 is calibrated for 8 - 330 pounds per hour for higher flow rates. A bypass valve 104 is connected between the two flow meters to open and close communication between the two flow meters depending upon the flow rate being measured.

An elongated flexible conduit 106 is connected to the inlet of flow meter 100 and an elongated flexible conduit 108 is connected to the outlet of flow meter 102. The free ends of conduits 106 and 108 each carry a releasible coupling 88.

Figure 5:
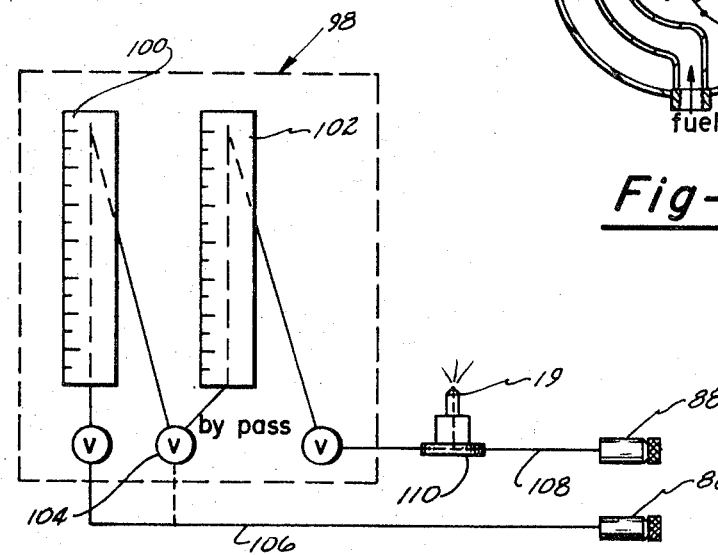
FIG. 5 is a schematic view of a preferred flow meter.

As best shown in FIG. 5, a connector 110 is disposed in conduit 108 for mounting an injection nozzle 19. Each nozzle 19 can be mounted in connector 110 to compare its fuel discharge to that of the other nozzles by connecting conduit 106 to a source of fuel such as to the outlet of boost pump 28. This comparison test provides a special advantage in permitting the user to quickly check the condition of the injection nozzles without sophisticated equipment.

To illustrate the use of apparatus 66, assume the pilot of aircraft 10 notes that when flying at cruising speed, engine 12 sounds normal but the cockpit instruments indicate that when the fuel mixture is set such that the engine's exhaust temperature is 100° F. below peak, the flow meter on the plane's instrument panel shows that fuel consumption is 5 pounds per hour more fuel than normal. When the fuel mixture is leaned out so that the flowmeter indicates proper fuel flow, the exhaust temperature exceeds allowable peak temperature. The aircraft flow meter has been inspected and found to be satisfactory. The problem is to diagnose the condition of the fuel injection components.

Apparatus 66 is positioned adjacent engine 12 while aircraft 10 is in a parked position. A "T" pipe adaptor 112 is connected to the inlet of manifold 44. Conduit 42 is disconnected from the inlet of manifold 44 and connected to flexible conduit 106 such that the fuel output of valve assembly 24 is to flow meter 100. Flexible conduit 108 is connected to adapter 112 so that the fuel flow from valve assembly 24 to manifold 44 can be measured. Conduit 82 is connected to adaptor 112 while conduit 80 is connected to another "T" adaptor 112 connected at the inlet to valve assembly 24. A conduit 114 normally connects aneroid means 34 to the supercharger upperdeck manifold 64. An adaptor 112 is connected in conduit 114 and to conduit 90 such that gage housing 70 is in communication with supercharger 56.

Engine 12 is then warmed up to operating temperature. Before the engine is started, bleed valve 86 is opened to release air trapped in conduits 80 and 82 with boost pump 28 on "high," mixture lever 50 adjusted to "full rich," and throttle lever 48 positioned at "half open." Selector valve 84 is operated to clear air from both conduits 80 and 82 while the boost pump is operating. When bleed valve 86 is closed, selector valve 84 is again moved between its alternate positions to indicate both unmetered and metered fuel pressures on gage 68. Bypass valve 104 is closed so that all the fuel flow is indicated on flowmeter 100. Assuming that the manufacturers specifications indicate that at idling speed of 600 RPM, fuel flow should be 7 pounds per hour, unmetered fuel pressure should be 12 to 13 psi and metered fuel pressure 2 - 2.5 psi. By operating valve 84, we note that both metered and unmetered pressures on gage 68 are satisfactory. We note that fuel flow as indicated on flowmeter 100 is satisfactory.

Bypass valve 104 is then opened and engine speed increased to 2,600 RPM. At this speed, fuel flow should be 123–130 pounds per hour, unmetered fuel pressure should be 25-27 psi and metered fuel pressure 15.5 to 16.5 psi. The user notes that metered fuel pressure is actually 18 psi which means either that manifold valve 44 is out of calibration or that one or more nozzle assemblies 19 is restricted. A set of master nozzles is installed and the test repeated to determine whether the problem is in the nozzles or the manifold valve.

Similarly, other problems can be diagnosed by comparing pressure and flow readings. For example, sometimes control valve assembly 24 returns fuel through conduit 52 when mixture lever 50 is in its "full rich" position. Since in this position, no fuel should be passing through conduit 52, flowmeter conduits 106 and 108 can be connected between conduit 52 and either valve assembly 24 or pump assembly 20 to diagnose such a problem.

In addition, flow meter means 98 can be employed to determine whether mixture control lever 50 is shutting off fuel flow through conduit 42 when engine 12 is to be turned off. The amount of fuel being returned through conduit 34 can also be measured by connecting flow meter means between conduit 34 and fuel tank 18.

Thus it is to be understood that I have described in detail a novel portable test apparatus for diagnosing the condition of the individual components of a fuel injector system. Both pressure and flow measurements can be quickly provided at several locations in the system and compared to the manufacturer's specifications to determine what corrective measures are necessary.

Having described my invention, I claim:

1. In combination,
   an internal combustion engine having a manifold for receiving air;
   means mounted on the engine including a source of combustible fuel, fuel injector nozzle means, and fuel delivery means connected to the nozzle means for delivering fuel thereto from said source as the engine is being operated by combustion of a mixture of said fuel and said air;
   a portable housing having an air chamber with an inlet;
   a movable indicator mounted on the housing, and a pressure-responsive guage member mounted in the air chamber and connected to the indicator for biasing it according to air pressure in said air chamber;
   elongated flexible first conduit means connecting the pressure-responsive guage member to the fuel delivery means such that the bias of the guage member depends upon the fuel pressure in the fuel delivery means; and
   second conduit means connecting the air manifold to the inlet of the air chamber, and valve means connected in the second conduit means so as to be operable to open communication between the air manifold and the air chamber whereby the indicator indicates a pressure that is a function of said fuel pressure and the air pressure in the air chamber.

2. A combination as defined in claim 1, including air throttle means for controlling the ratio of said air and said fuel being mixed for combustion.

3. A combination as defined in claim 1, in which the gauge member is hollow and has an inlet; including second valve means connected to the inlet of the gauge member; and the first conduit means comprises a pair of elongated conduit members, each suited for connection in spaced locations to the fuel delivery means.

4. A combination as claimed in claim 1, including a flow meter and means for connecting the flow meter to the fuel delivery means to receive fuel therefrom.

5. A combination as defined in claim 1, including a connector in said first conduit means for mounting a fuel injection nozzle that has been removed from the engine such that fuel being received by the conduit means is discharged through the nozzle.

6. A combination as defined in claim 1, including super-charger means connected to the air manifold for delivering air under pressure to the air manifold.

7. A combination as defined in claim 1, in which the fuel delivery means comprises a fuel pump.

8. A method for testing the operation of an internal combustion engine having a source of combustible fuel an air manifold, a supercharger connected to the air manifold, fuel injector means and fuel delivery means connected to the injector means for delivering fuel thereto as the engine is being operated by combustion of fuel and air, said method comprising the steps of:
   mounting adjacent the engine a portable gauge housing having a hollow pressure-responsive gauge member connected to an indicator for biasing it according to pressure in the gauge member;
   connecting an elongated flexible conduit between the gauge housing and the air manifold such that the pressure responsive gauge member biases the indicator according to a function of the fuel pressure in the gauge member and the air pressure in the housing;
   connecting elongated flexible conduit means to a pair of spaced connections in said fuel delivery means, and to the pressure-responsive gauge member, and connecting valve means in the conduit means for selectively opening communication between either of said spaced connections in the fuel delivery means and the gauge member;
   opening communication between a first of said connections and said pressure-responsive gauge member to obtain a reading from the indicator of a first pressure as the engine is being operated by fuel being delivered by the fuel delivery means;
   closing communication between the first connection and opening communication between the second of said connections and the pressure-responsive gauge member to obtain a reading from the indicator of a second pressure; and
   replacing or adjusting a component of said fuel delivery means, whichever is appropriate, depending upon the difference between said readings and the specifications for a standard engine.

9. A method as defined in claim 8, in which the engine has an air manifold, and a supercharger connected to the air manifold, and including the step of connecting an elongated flexible conduit between the gauge housing and the air manifold such that the pressure-responsive gauge member biases the indicator according to a function of the fuel pressure in the gauge member and the air pressure in the housing.

* * * * *